INVENTOR.
ERWIN G. ROEHM
BY
H. K. Parsons & L. W. Wright
ATTORNEYS

INVENTOR.
ERWIN G. ROEHM
BY H. K. Parsons & L. W. Wright
ATTORNEYS

Dec. 23, 1952 E. G. ROEHM 2,622,489
TRACER CONTROL MECHANISM
Filed Dec. 10, 1947 7 Sheets-Sheet 3

INVENTOR.
ERWIN G. ROEHM
BY
H. K. Parsons + L. W. Wright.
ATTORNEYS

Dec. 23, 1952 — E. G. ROEHM — 2,622,489
TRACER CONTROL MECHANISM
Filed Dec. 10, 1947 — 7 Sheets-Sheet 4

INVENTOR.
ERWIN G. ROEHM
BY H. K. Parsons & L. W. Wright.
ATTORNEYS

Dec. 23, 1952        E. G. ROEHM        2,622,489

TRACER CONTROL MECHANISM

Filed Dec. 10, 1947        7 Sheets-Sheet 5

INVENTOR.
ERWIN G. ROEHM
BY
H. K. Parsons & L. W. Wright
ATTORNEYS

Dec. 23, 1952     E. G. ROEHM     2,622,489
TRACER CONTROL MECHANISM Filed Dec. 10, 1947     7 Sheets-Sheet 6

INVENTOR.
ERWIN G. ROEHM
BY
H. K. Parsons & L. W. Wright.
ATTORNEYS

Dec. 23, 1952     E. G. ROEHM     2,622,489
TRACER CONTROL MECHANISM Filed Dec. 10, 1947     7 Sheets-Sheet 7

*Fig.18.*

INVENTOR.
ERWIN G. ROEHM
BY
H. K. Parsons & L. W. Wright
ATTORNEYS

Patented Dec. 23, 1952

2,622,489

UNITED STATES PATENT OFFICE 2,622,489

TRACER CONTROL MECHANISM

Erwin G. Roehm, Norwood, Ohio, assignor to The Cincinnati Milling Machine Co., Cincinnati, Ohio, a corporation of Ohio Application December 10, 1947, Serial No. 790,746

11 Claims. (Cl. 90—62)

This invention relates to automatic copying machines and more particularly to improvements in tracer control mechanisms.

One of the objects of this invention is to improve the accuracy of reproduction in automatic copying machines and more particularly in automatic die sinking machines.

Another object of this invention is to provide new and improved means for establishing and maintaining anticipation of the tracer over the cutter in die sinking operations.

A further object of this invention is to maintain anticipation of the tracer over the cutter, regardless of whether the tracer is moving axially, laterally, or any angle between these two directions.

An additional use of this invention is to provide for anticipation of the tracer over the cutter which is automatically adjustable in amount in accordance with the selected rate of feed.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts.

In automatic pattern controlled die sinking operations it is the general practice to arrange the axes of the cutter and tracer normal to the general surface of the work and pattern because it is the most convenient arrangement that will provide clearance for the cutter as it sinks to the deepest parts of the die. In order to scan the entire surface of a pattern automatically, a method of scanning is utilized in which relative reciprocation between the work and cutter is effected in a direction laterally of the cutter axis, and between strokes a relative lateral indexing between the work and cutter is effected. By repetition of this procedure it will be obvious that any part or all of the surface of a pattern may be scanned.

During this scanning operation the relative approach and retractive movement between the cutter and work in a direction axially of the cutter will be going on as determined by the outline of the particular section of the pattern being traversed. The relative movement between the work and cutter transversely to the cutter axis is referred to as the feeding movement, and its rate is preferably automatically decelerated whenever the cutter is adjusted toward or from the work. Thus, there may be times that the cutter may be moving relatively axially into the work with the feeding movement almost stopped; or the feeding movement may be continuing at its highest rate with the cutter spindle stationary in an axial direction; and at other times the combined movements of feed and cutter will produce various angular movements, the resultants of which may vary in direction through an angle of 180 degrees.

It is known in this art, where deflective tracers are utilized to control power operated mechanisms, that a slight time lag exists between initiation of a change in tracer deflection and the final execution of the follow-up movement in the cutter. This time lag is practically a constant for a given mechanism because it is independent of and does not vary with the feed rate of the machine.

It has been the practice in the profiling art, with the tracer and cutter engaging corresponding points on the pattern and work, to adjust the tracer relative to the cutter to give the tracer a slight lead over the cutter in the direction of scanning which is in a plane normal to the axis of the cutter. This provides a slight anticipation for the tracer of contour changes in the pattern and thus compensates for time lag, with the result that the shape of the pattern is more accurately duplicated in the work. This is practical where the direction of feed is in a single plane normal to the cutter axis as in profiling operations.

This method, however, cannot be used in die sinking operations because the cutter is not working in a single plane but is subject to axial movements normal to said plane in addition to its lateral movement, and therefore is normally working in a vertical plane normal to the work support. Various combinations of these axial and lateral movements produce resultant angular cutting paths lying in a vertical plane, the angle changing in accordance with every angular change in the surface of the pattern. It is obvious under these conditions that the direction of the lead must angularly change with angular changes of the scanning path. This is not possible with present devices. This invention is directed to maintaining the lead of the tracer over the cutter in the proper direction and coaxial with the direction of resultant movement between the work support and cutter support regardless of angular changes in the direction of that movement in the plane normal to the work and pattern.

This is accomplished by mounting the tracer support for oscillation in a manner to impart a crank motion to the pattern engaging tip of the tracer finger. The center of this crank motion would be a point on the pattern corresponding to the point on the work engaged by the cutter and which the tracer would normally engage if no lead were given to it. The radius of this crank motion thus represents the lead that the tracer has with respect to the cutter. The crank motion serves to change the angularity of the lead which is the effective radius to the tracer tip and thus maintain it in the direction of scanning.

Figures 2, 19:
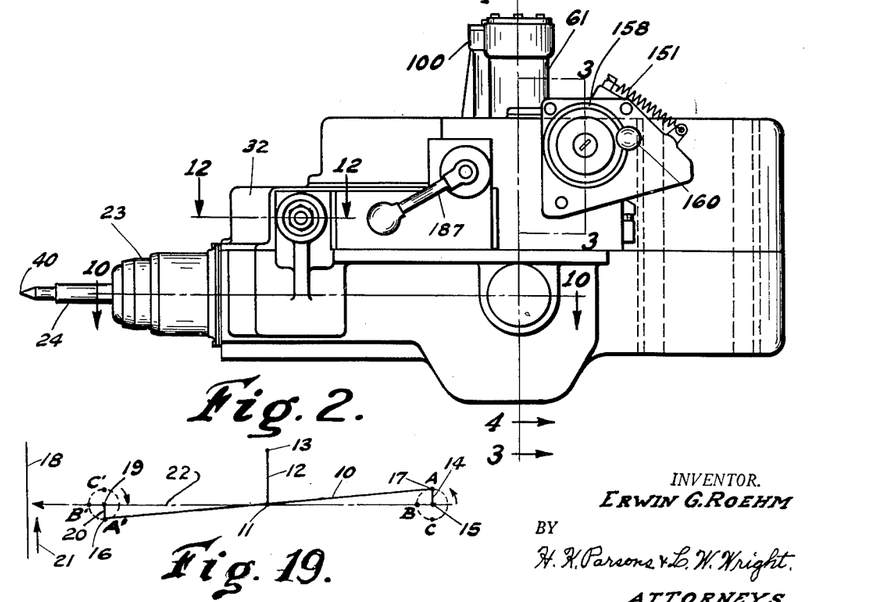
Figure 2 is an elevational view of the device shown in Figure 1.
Figure 19 is an elemental diagram illustrating principle of tracer adjustment.

An elemental diagram of this principle is shown in Figure 19 of the drawing in which the reference numeral 10 indicates the axis of the tracer support in some angular position, and the reference numeral 11 indicates a pivotal connection between the tracer support and a supporting link 12 which is oscillatable about a fixed pivot 13.

By connecting a crank arm 14 to one end of the axis 10, it will be obvious that rotation of the crank about a fixed pivot 15 will cause a crank path motion of the end 16 of the tracer arm 10. In other words, when the pivot pin 17 of the crank arm 14 and axis 10 is at the position A, the point 16, which could well represent the tip of a tracer finger, is at the point A'; and counter-clockwise rotation of the crank arm 14 to the point B will move the point 16 in a crank path motion to the position B' and in this position the axis 10 would be perpendicular to the tracer support 18.

It will be noted that the point 16 has moved about a center 19 and that the point 16 is a prescribed radial distance 20 from the center 19. As the point 16 moved from the position A' to the position B', the radial arm 20 which is the effective radius also moved in a clockwise direction and by coordinating this construction with a power feeding means, the orientation of the radius 20 may serve to indicate the direction of relative feeding movement between the tracer and the pattern, and since the length of the radial arm 20 corresponds to the lead, it will be obvious that the lead of the tracer over the cutter will always be in the direction of scanning. In other words, the point or center 19 represents the corresponding point or tip of the cutting tool, the arrow 21 represents the direction of scanning, the arrow 22 represents the direction of movement of the tracer and cutter toward and from the support 18, and the angular position of the radial arm 20 indicates the resultant direction of the cutting path as determined by the rate components in the directions 21 and 22.

It will now be apparent that, by using a deflectable tracer having suitable control means coupled thereto for determining and controlling the rate components in the directions 21 and 22 and thereby the resultant direction of scanning and by coupling thereto the crank arm 14 for simultaneous operation therewith, the direction of the tracer lead may be simultaneously and automatically adjusted with changes in the direction of scanning whereby the tracer will always be held in a leading position with respect to the cutter regardless of the angular direction of scanning.

Figure 1:
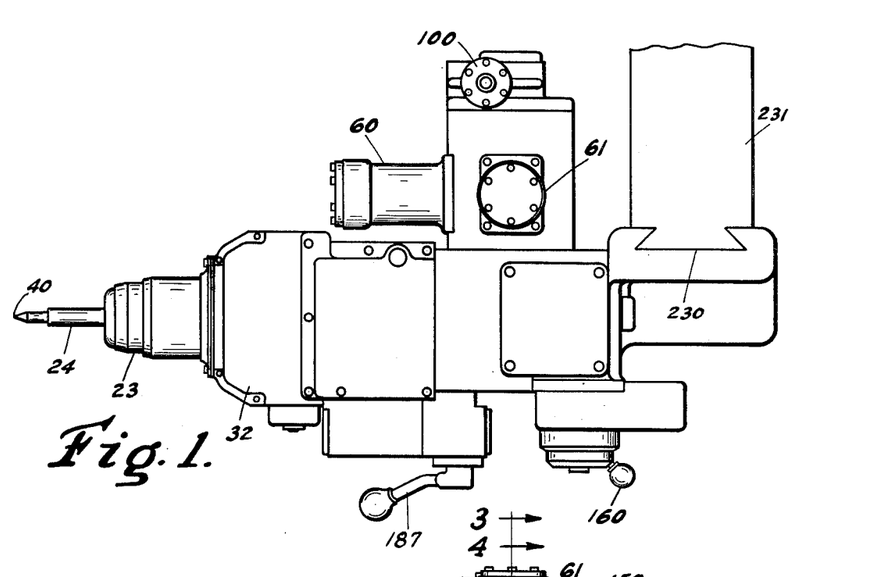
Figure 1 is a plan view of an embodiment of this invention.
Figures 15, 16, 17:
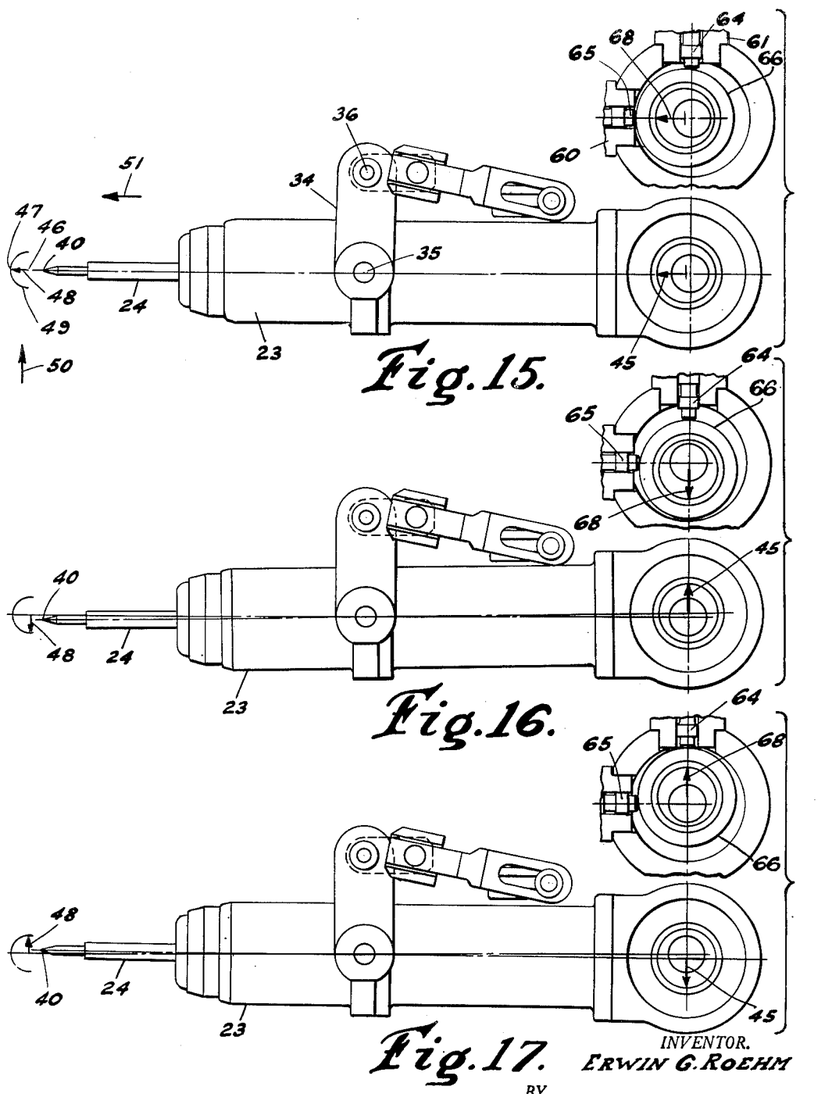
Figures 15, 16, and 17 are views showing different positions of the tracer valve housing.

A physical embodiment of the principles of this invention is shown in Figures 1 and 2. The specific manner of supporting the tracer in accordance with the foregoing explanation, however, is shown in Figures 15, 16, and 17 to which reference may now be had. In these figures the reference numeral 23 indicates the tracer housing which has a deflectable tracer 24 mounted therein as shown more particularly in Figure 10. At the end of the housing opposite to the tracer finger there is provided a bore 25 in which is mounted an anti-friction bearing 26. An adjustable eccentric means 27' is supported by this bearing comprising an outer member 27 which is held against axial movement and an inner member 28 which is axially slidable on a supporting shaft 29 which is journaled by anti-friction bearings 30 and 31 in the main frame 32. The member 28 is slidable in the bore 33 of the member 27, the bore being inclined with respect to the axis of the shaft 29 whereby to effect lateral adjustment of the member 27 and thus change its eccentric relation with respect to the axis of the shaft 29. This eccentric mechanism is the mechanical equivalent of the crank arm 14 and rotation thereof imparts oscillation to the tracer housing 23.

Figures 11, 12, 13, 14:
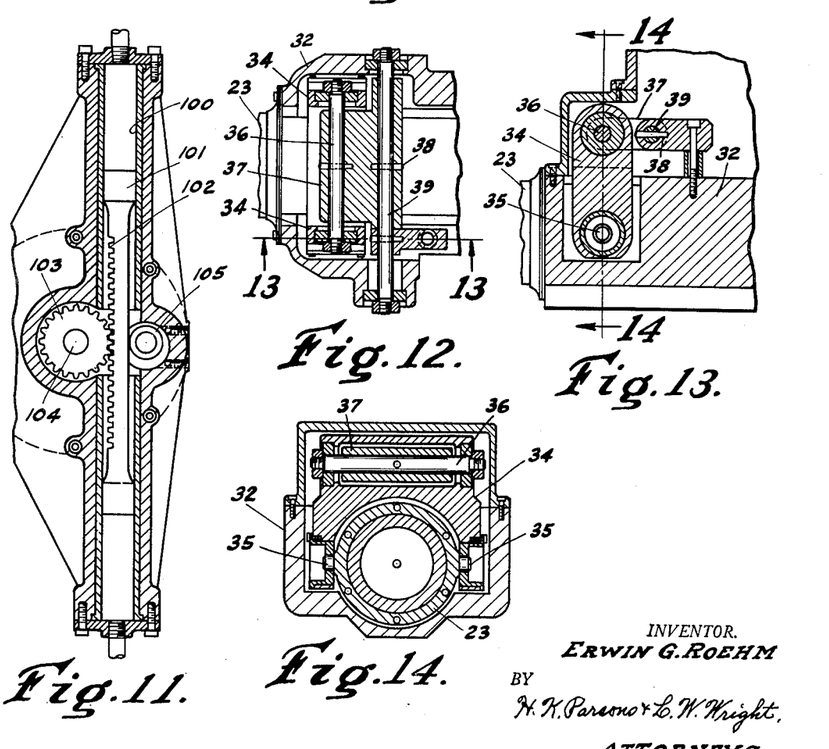
Figure 11 is a section on the line 11—11 of Figure 3.
Figure 12 is a section on the line 12—12 of Figure 2.
Figure 13 is a plan sectional view on the line 13—13 of Figure 12.
Figure 14 is a sectional view on the line 14—14 of Figure 13.

The housing 23 is further supported by a bifurcated link 34 which, as shown in Figure 14, engages laterally extending pins 35 integral with the tracer housing 23. The link is connected by a pin 36 to a crank 37. The crank 37 is pinned at 38 to a shaft 39 which is supported at opposite ends in the frame 32.

Thus, the housing 23 is free to be swung about the pivot pin 36 by rotation of the eccentric and thus impart a crank path motion to the tracer point 40.

Figure 10:
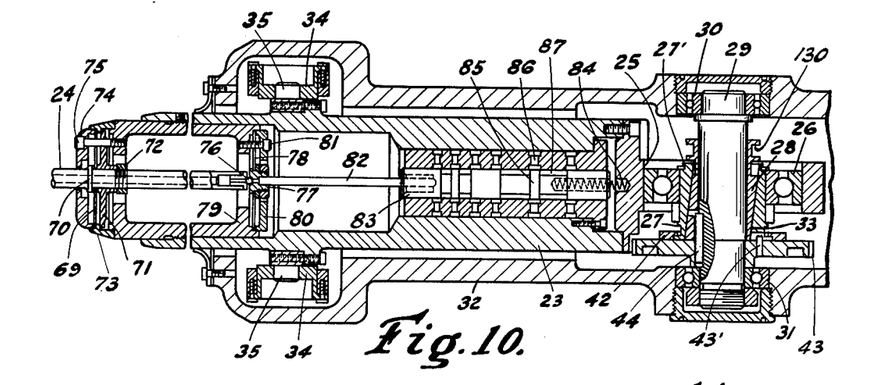
Figure 10 is a section on the line 10—10 of Figure 2.

The eccentric adjusting member 28 is shown positioned in Figure 10 in its zero eccentric position. The outside member 27 is supported on the member 28 but held against axial movement by its flange connection 42 with the gear 43. The gear 43, together with member 28, are keyed at 44 to the shaft 29, but the gear is held against axial movement, while the member 28 may be moved axially relative to the shaft and other parts so that axial shifting thereof will effect radial shifting of the member 27 and thus adjust it eccentrically with respect to the supporting shaft 29. Power is thus transmitted from gear 43 through pin 43' to member 27 and through key 44 to member 28 and shaft 29.

In Figure 15 the eccentric has been adjusted in the direction as indicated by the arrow 45. It should now be obvious that if the gear 43 is rotated that the arrow 45 will rotate, and in Figure 16 it is shown rotated 90 degrees in a clockwise direction, and in Figure 17 it is shown rotated 90 degrees in a counterclockwise direction from its position in Figure 15.

The eccentric adjustment in the direction shown in Figure 15 moved the tracer point 40 from the position 46 shown in the enlarged diagram adjacent the end of the tracer point to the position 47. The position 46 indicates the location of the tracer point if no eccentric adjustment is imparted to the tracer and corresponds to the position of the cutter. Thus, the radius 48 indicates the lead of the tracer, and the arrow on the radius indicates the direction in which the tracer leads the cutter. The arc 49 therefore represents the path through which the point 47 would move upon rotation of the eccentric as represented by the arrow 45. Thus, in Figure 16 if the arrow 45 is rotated 90 degrees in a clockwise direction the radius 48 would move through an angle of 90 degrees, but in a counterclockwise direction; or, as shown in Figure 17, if the arrow 45 is rotated 90 degrees in a counterclockwise direction from its position shown in Figure 15 the arrow 48 would rotate 90 degrees in a clockwise direction. Thus, oscillation of the eccentric effects a crank path motion of the tracer point.

As previously stated, the direction of the lead of the tracer over the cutter is coupled with the resultant direction of feed between the cutter and work whereby they are simultaneously adjusted. For purposes of explanation the direction of movement of the pattern relative to the tracer as effected by one of the power actuated slides may be indicated by the arrow 50, and the direction of movement of the tracer and cutter axially toward and from the pattern and work may be indicated by the arrow 51. Thus these two arrows combined define the working plane of the tracer and cutter.

Figure 18:
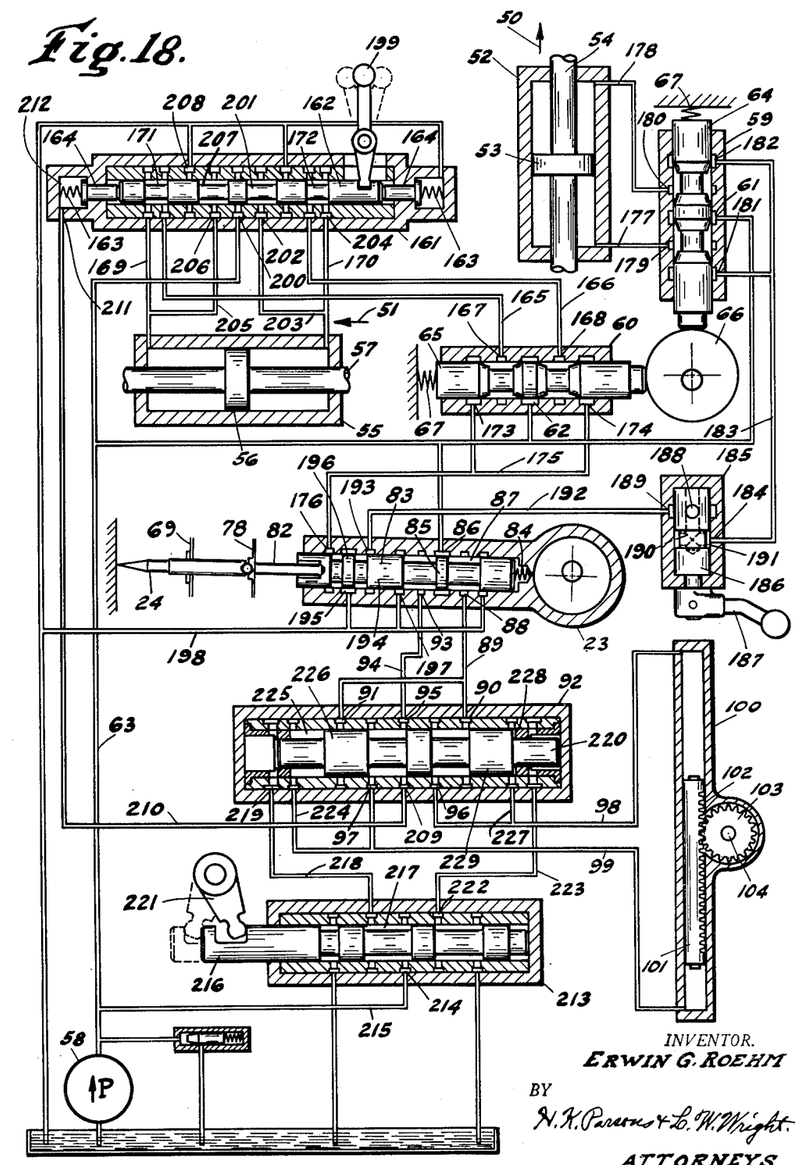
Figure 18 is a view of the hydraulic control circuit.

The means for effecting these movements are represented by hydraulic motors in Figure 18 and include the cylinder 52 having a contained piston 53 and a piston rod 54 which is movable in a direction parallel to the arrow 50; and a second cylinder 55 having a piston 56 for moving a piston rod 57 in the direction of the arrow 51. The flow of hydraulic fluid from a suitable source, such as a pump 58 to these motors, is governed by rate and direction valves 59 and 60 which have pressure ports 61 and 62 respectively which are connected to the supply line 63 of the pump 58. These valves have valve plungers 64 and 65 respectively, and when these plungers are in a central position longitudinally with respect to the pressure ports no unbalanced flow of fluid to the cylinders will occur and therefore the pistons will remain stationary.

The position of these valve plungers 64 and 65 is determined by a second eccentric mechanism similar to the one just described and which may be termed the rate and direction eccentric. The eccentrically adjustable member of this mechanism is indicated by the reference numeral 66, and it will be noted that both valve plungers are held in contact with the periphery of this member by springs 67. This member simultaneously determines the position of the two valve plungers and thereby the rate and direction of movement of the two slides and thereby the resultant movement between cutter and work. By rotating the eccentric this resultant direction may be oriented to any position throughout an angle of 360 degrees.

The two eccentric mechanisms are geared together for simultaneous rotation but in opposite directions, and in a manner to correlate the resultant direction of movement of the two slides with the direction of lead of the tracer with respect to the cutter.

The manner in which these eccentrics are correlated will now be explained. By referring to Figure 15 the arrow 68 indicates the direction in which the rate eccentric has been shifted, while the arrow 45 indicates the direction in which the tracer eccentric has been shifted, and it will be noted that these two are shifted in the same direction and the two eccentric mechanism are geared together in this relationship. The direction in which the arrow 68 points indicates that the rate and direction valve plunger 65 has been shifted to cause a movement of the tracer and tool in the direction of arrow 68, and since this direction is perpendicular to the valve plunger 64, this plunger remains in a neutral position resulting in no movement of its corresponding slide. The arrow 45 indicates that the tracer point has been shifted in the direction of the arrow 48, and therefore is in a leading position for movement of the tracer and cutter in the direction of arrow 51 produced by the position of the rate and direction valve plunger 65. Thus, the tracer has a lead in the direction of movement produced by the rate and direction control eccentric.

Assume now that the rate and direction control eccentric is rotated counterclockwise through an angle of 90 degrees to the position shown in Figure 16. Due to the intergearing between the eccentrics, this will cause clockwise rotation of the tracer eccentric through an angle of 90 degrees. The rate and direction control valve 64 will now be in a position to cause movement of this slide in the direction of arrow 68 while the other control valve plunger 65 will be in neutral position, causing no movement of its connected slide. The rotation of the tracer eccentric through 90 degrees clockwise will cause rotation of the arrow 48 through 90 degrees counterclockwise whereby the arrow 48 will be pointing in a parallel direction to the arrow 68 and again it will be seen that the tracer will lead the cutter for this direction of movement.

Referring to Figure 17, the rate and direction control eccentric has been rotated 90 degrees in a clockwise direction from the position shown in Figure 15, thereby shifting the control valve plunger 64 to a position to cause movement of its slide in the direction of arrow 68, while the other control valve 65 still remains in a neutral position. This rotation will cause rotation of the tracer eccentric and thereby rotation of the tracer point so that it will have a lead in the direction of arrow 48 as shown in Figure 17 which is parallel to the direction of arrow 68 in this figure, and again it will be noted that the tracer leads the cutter in the driection of movement as determined by the rate and direction control valve.

The manner of controlling the rotation of these eccentrics from the tracer will now be explained, reference being had to Figure 10.

The tracer finger 24 is supported by a diaphragm 69 which is secured to the finger between a shoulder 70 and a collar 71, the parts being secured together by a nut 72. The peripheral edge of the diaphragm 69 is supported or is clamped to the member 73 by a cap 74 which is held in place by screws 75. The diaphragm allows a certain amount of lateral deflection of the tracer finger. The inner end of the tracer finger acts on a ball 76 which is positioned between sockets formed in the end of the member 24 and a member 77 which, in turn, is supported in position by a second diaphragm 78. This diaphragm is also clamped by its peripheral margin between the fixed member 79 and a cap 80 which is secured in position by clamping screws 81.

The operating effect is that any lateral deflection of the tracer finger 24 will cause the ball 76 to attempt to roll out of its confining sockets and thereby cause deflection of the diaphragm 78 and thus axial movement of the connecting rod 82 which is interposed between the member 77 and the tracer valve plunger 83. The valve plunger is continuously urged by a spring 84 toward the left and this movement is limited by the collar 71. When the tracer is out of engagement with a pattern the limitation on this movement is such that the spool 85 on the valve plunger is slightly to the left of the pressure port 86 whereby the pressure port is connected by the annular groove 87 in the valve plunger to the motor port 88, which as shown in Figure 18 is connected by channel means 89 to a pair of ports 90 and 91 of a reversing valve 92.

The tracer valve has a second motor port 93 which is connected by channel 94 to port 95 of the reversing valve. The reversing valve has a pair of ports 96 and 97 which are connected by channels 98 and 99 to opposite ends of a cylinder 100 which contains a free piston 101. This cylinder and piston comprise a direction control motor. This piston 101 has rack teeth 102 which mesh with a gear 103 secured to a shaft 104. It should now be evident that if the tracer valve plunger is in a central position that no unbalancing flow to the cylinder 100 will occur but if the valve is shifted to either side of a central position that an unbalancing flow will occur to the cylinder 100 and thereby cause rotation of the gear 103.

The specific construction of the direction control motor is shown in Figure 11, and it will be noted that the piston 101 is provided with a backing up thrust roller 105 located opposite the gear 103 to insure against deflection of the piston due to its extreme length. The roll 105 is eccentrically supported on member 106 whereby the member 106 may be rotated to change the thrust of the roller 105 on the piston 101.

Figure 3:
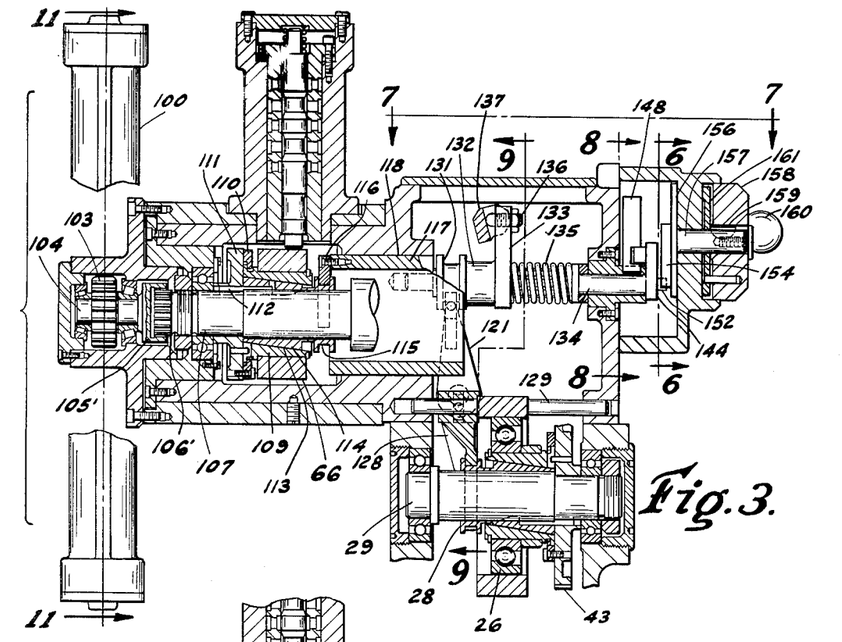
Figure 3 is a sectional view on the line 3—3 of Figure 2.
Figures 4, 5:
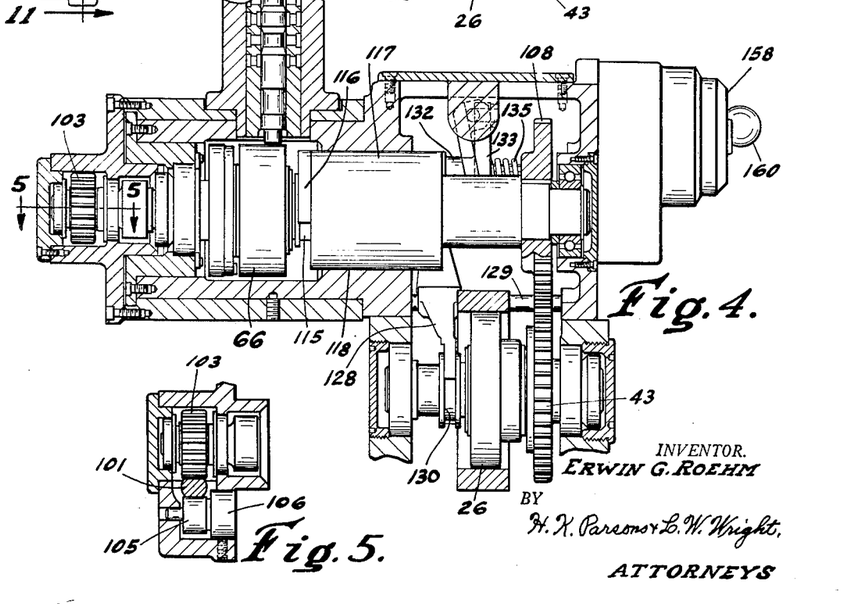
Figure 4 is a sectional view on the line 4—4 of Figure 2.
Figure 5 is a detail section on the line 5—5 of Figure 4.

The shaft 104 which carries the gear 103 is anti-frictionally mounted in a fixed part of the mechanism as shown in Figures 3 and 4 and is provided on the end with a clutch member 105' which is adapted to interengage a clutch member 106' secured to a shaft 107. The shaft 107 is the one that supports and drives the rate and direction control eccentric 66 and also supports and drives a gear 108, as shown in Figure 4, which is intermeshed with the gear 43 which drives the tracer eccentric 26.

The eccentric 66 is supported by a sleeve 109 which is secured by a flange 110 to a disc 111 which is keyed at 112 to the shaft 107, the flange 110 being of such construction that it holds the sleeve against axial movement but permits lateral movement thereof. The sleeve has an inclined bore 113 formed therein which fits an inner shifter sleeve 114 which is also keyed by the key 112 to the shaft 107. The inner sleeve 114 has a shifter groove 115 which is engaged by a shifter fork 116 that is carried by a tubular sleeve 117 which is slidable in a bore 118 formed in the fixed part of the mechanism. By shifting the sleeve 114 axially the outer sleeve 109 is shifted eccentrically with respect to the axis of the shaft 107 but is held against axial movement by the flange 110.

Figure 7:
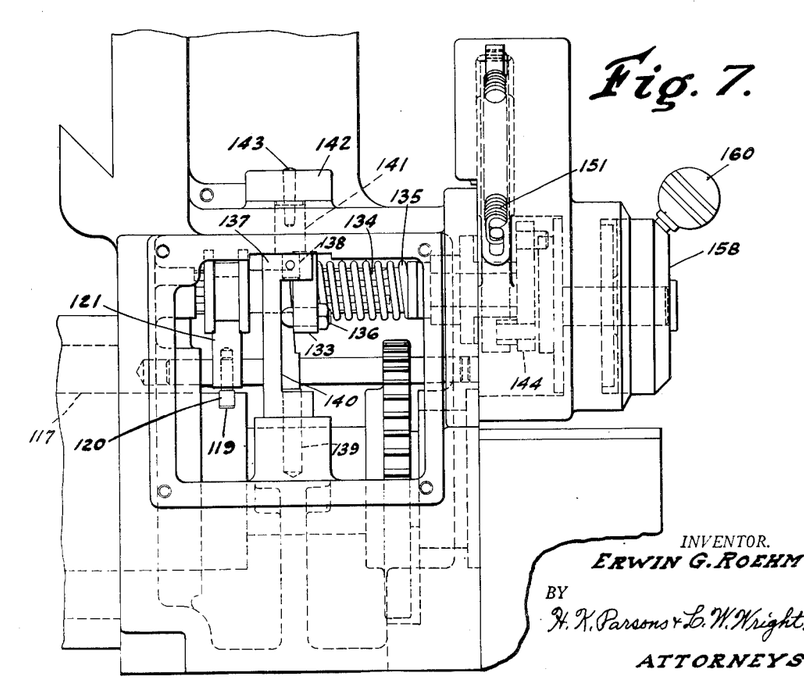
Figure 7 is a view on the line 7—7 of Figure 3 with the cover plate removed.
Figure 9:
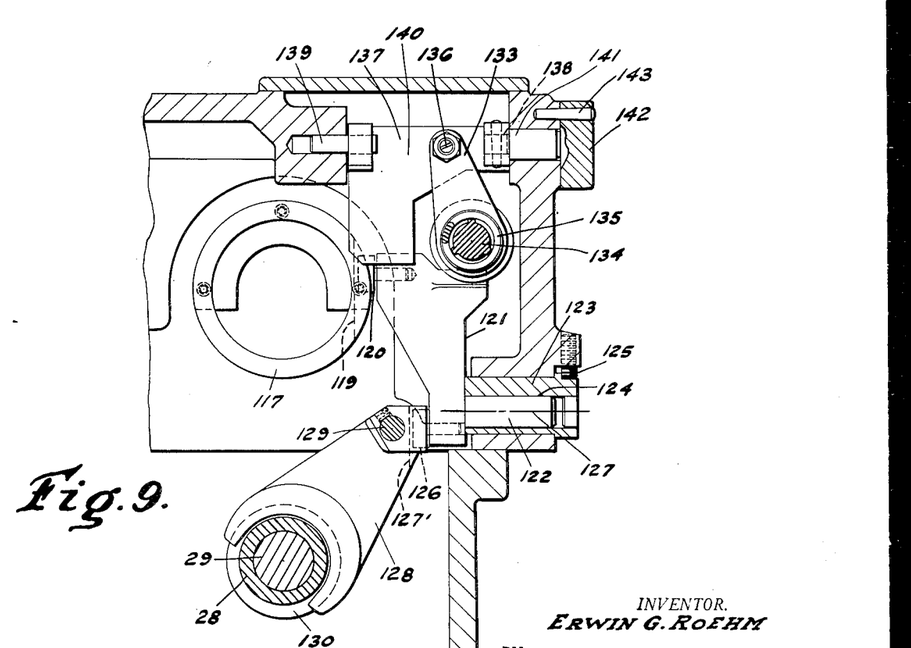
Figure 9 is a detail section on the line 9—9 of Figure 3.

A mechanism is provided for effecting simultaneous adjustment of both eccentrics. The sleeve 117 has a cross groove 119 cut in the periphery thereof, as shown in Figures 7 and 9, and a shoe 120 is fitted in this groove and attached to a swinging lever 121 which is pivoted at its lower end by a supporting pin 122 which fits in a bushing 123. The bore 124 which receives the pin 122 is located eccentric to the axis of the bushing 123 whereby the bushing may be rotatably adjusted to adjust the position of the lever 121, and a set screw 125 is provided for locking the bushing in its adjusted position.

The lever 121 carries a second shoe 126 which is located eccentric to the axis of rotation 127 of the pin 122, and it will be noted that this shoe has a very small arc of movement as compared to the arc of movement of the shoe 120. The shoe 126 fits in a socket 127' formed in the side of the shifter fork 128 which is slidably supported on the rod 129. The shifter fork 128 engages a shifter groove 130 which is formed on the end of the shifter member 28, previously referred to in connection with Figure 10, of the tracer eccentric. It will now be seen that the pivoted lever 121 is operatively connected to both eccentrics and that adjustment of this lever will effect simultaneously adjustment of both eccentrics.

It should be understood that the eccentric adjustment of the tracer is very small, that is of the order of a few thousandths of an inch, which accounts for the small adjustment imparted to one eccentric as compared to the other even although both are simultaneously adjusted.

The upper end of the lever 121 fits in a groove 131 of a shifter spool 132 which has an integrally formed lever arm 133. The spool 132 is slidably mounted on a splined shaft 134 as shown in Figure 9 whereby rotation of the shaft will effect rotation of the lever arm 133. The spool 132 is also continuously urged relative to the shaft 134 toward the left, as viewed in Figure 3, by a spring 135. The extent of this movement is limited by a set screw 136, which is adjustably mounted in the end of the lever 133, and which engages a stop plate 137. The stop plate is shown more clearly in Figures 7 and 9, and referring to Figure 7 it will be noted that one end of the plate is connected to a supporting pin 138, and the other side of the plate supported by a pin 139.

It will be noted from Figure 7 that the face 140 of the plate 137 against which the set screw 136 bears is located to one side of the axis of the supporting pins 138 and 139, and that when the set screw 136 lies on the axis of these pins as viewed in Figure 9 that no rotative force is applied to the plate 137. It should now be evident that the shifter spool, which controls through the winding lever the adjustment of the two eccentrics, is held against the angular stop plate by the spring 135. Thus, rotation of the lever 133 through the spline connection with the shaft, will simultaneously cause it to be shifted from its position shown in Figure 9 due to the angular setting of the plate 137. The angular position of the plate 137 is determined through its pin connection 138 to shaft 141, by an external knob 142 attached to shaft 141 and secured in final position by a pin 143.

Figure 6:
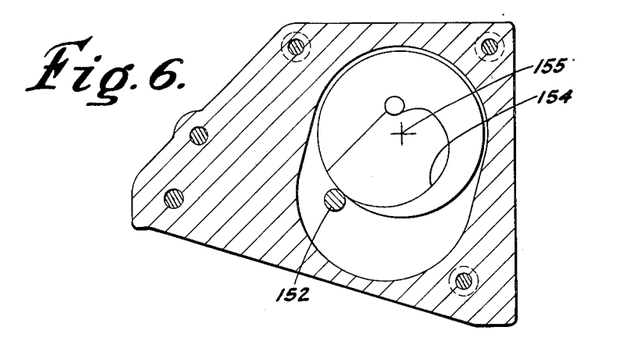
Figure 6 is a detail section on the line 6—6 of Figure 3.
Figure 8:
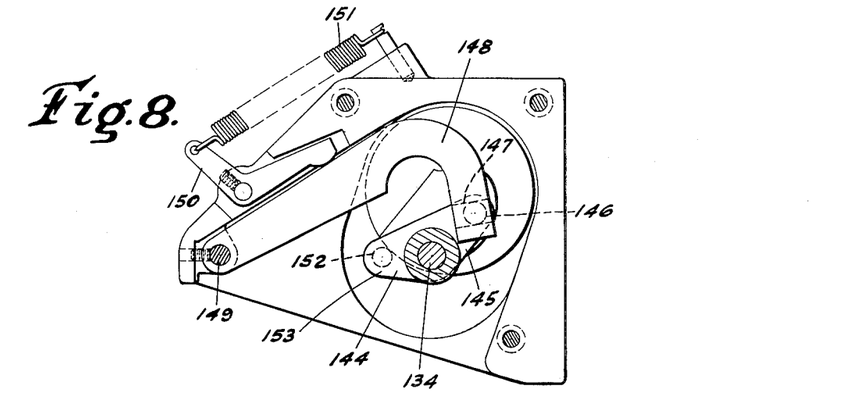
Figure 8 is a detail section on the line 8—8 of Figure 3.

Rotative adjustment of the spline shaft 134 is controlled in the following manner. The shaft 134 has a reduced portion, as shown in Figure 3, to which is attached a double-ended crank 144 as more particularly shown in Figure 8. One arm 145 of this lever has a pin connection at 146 engaging a groove 147 in the end of a hook lever 148. This lever is pivoted on a pin 149. A spring operated bell crank 150, which is continuously urged in a clockwise direction by a spring 151, engages a midpoint on the lever 148 to continuously urge the lever 148 in a clockwise direction and thereby through the pin connection 146 effect clockwise urge on the shaft 134. This urge, however, is opposed by a pin 152 carried by the other arm 153 of the crank 144, which pin engages the periphery of a control cam 154 shown more clearly in Figure 6.

This lever mechanism actuated by the spring 151 acts to continuously maintain engagement of the pin 152 with the periphery of the cam 154. It will be noted that the shape of the cam surface 154 is such that rotation thereof in a clockwise direction, as viewed in Figure 6, will permit movement of the pin 152 toward the center of rotation 155 of the cam. The pin 152 controls the rotative position of the shaft 134 and the rotative position of the shaft determines the angular position of the arm 133 with respect to the inclined stop plate 137, while the inclination of this plate determines the amount of shifting movement to be imparted to the shifter spool 132 for any angular position of the arm 133, and thereby the amount of shifting of the two control eccentrics. As previously stated, the amount of radial shifting of the eccentric 66 determines the rate of movement between the work and cutter. Thus, the pin 152 may be considered as a feed rate control, and the cam 154 as a feed rate control cam.

Referring to Figure 3, the cam 154 is attached to a plate 156 secured to a shaft 157 which extends to the exterior of the machine and is provided with a rate control disc 158 which is keyed at 159 to the shaft. The disc has an operating knob 160 secured thereto. In order to insure that the parts will remain in position after rotative adjustment there is provided a friction disc 161 on the shaft 157 which is in the form of a spring diaphragm which urges the shaft 157 toward the right as viewed in Figure 3, and thereby causes considerable friction between the face of the disc 156 and the supporting housing to thereby hold the parts in adjusted position.

The manner of connecting the parts together for operation and control of a machine will now be explained in connection with Figure 18. In this figure there is a tracer engagement and disengagement control valve 161 having a plunger 162 which is normally held in a central position by means of springs 163 and headed plungers 164 acting on opposite ends of the valve. When the plunger 162 is in this position it interconnects the channels 165 and 166, leading from motor ports 167 and 168 of valve 60, to channels 169 and 170 respectively by means of the annular grooves 171 and 172. The channels 169 and 170 are connected to opposite ends of the cylinder 55 which controls movement of the tracer to and from a pattern. This places the piston 56 under control of the valve 60. This valve has a pair of exhaust ports 173 and 174 which are connected by a common channel 175 to a port 176 of the tracer valve.

The opposite ends of the cylinder 52, which affects the other direction of movement between the tracer and pattern, is connected by channels 177 and 178 to motor ports 179 and 180 respectively of control valve 59. This valve has a pair of exhaust ports 181 and 182 which are connected by a common channel 183 to port 184 of a start and stop control valve 185. This valve has a plunger 186 which is rotatable by a control handle 187 for aligning a cross bore 188 with a port 189. The cross hole 188 is connected at all times by the interdrilled passage 190 to the annular groove 191 which is opposite the port 184. This valve is shown in a closed position. The port 189 is connected by a channel 192 to port 193 of the tracer valve.

When the tracer is out of engagement with a pattern, the tracer valve 83 is normally urged to the left as viewed in this figure by the spring 84 whereby the port 193 is closed by the spool 194 and the port 176 is disconnected from a central exhaust port 195 by the spool 196. Also, in this position the tracer valve plunger interconnects the pressure port 86 with the port 88 and interconnects the port 93 with an exhaust port 197 which is connected to the return line 198. This means that with the pump running, pressure fluid from port 86 will flow through port 88, line 89, interconnected ports 90 and 96, and line 98 to move the control motor piston 101 to the end of the cylinder 100 and since the other end of the cylinder is connected to reservoir through line 99, interconnected ports 97 and 95, line 94 and interconnected ports 93 and 197, it will remain in this position.

Attention is invited to the fact that the gear 103 which is rotated by the rack piston 101 is capable of rotation through 360 degrees. In other words, the cylinder 100 is made of such length that a full stroke of the piston 101 from the lower end of the cylinder to the upper end of the cylinder is sufficient to impart one complete revolution to the gear 103, from which it will be apparent that, regardless of which end of the cylinder 100, the piston 101 happens to be in, the directional component of the rate and direction cam will be in the same position and that position corresponds to the diagrammatic position of the parts shown in Figure 15. Therefore, the position of the arrows 45 and 68 in Figure 15 represent the starting position which is the same regardless of whether the piston 101 is at one end of the cylinder or the other end. The difference is that if the piston 101 is at the lower end of the cylinder it will affect rotation of the arrows in one direction from the starting position upon upward movement of the piston; or if the piston is at the upper end of the cylinder 100 and starts to move down it will cause rotation of the arrows in an opposite direction from the starting position shown.

In other words, there can never be continuous rotation through the starting position shown. It will be noted that in this position the arrows are pointed in such a direction as to cause movement of the tracer toward the pattern to effect engagement therewith, but even with the pump running and the eccentric positioned to cause movement of the tracer toward the pattern, no action will take place because both of the return lines 175 and 192 from the slide cylinders 55 and 52 are blocked by the tracer valve.

Therefore, in order to start operation of the machine, the operator throws the control lever 199 which is operatively connected to the valve plunger 162 to the right, thereby shifting the plunger 162 to the left. This valve has a pressure port 200 which is directly connected to the pump 58 and when the plunger 162 is shifted toward the left this port is connected by the annular groove 201 to port 202. This port is connected by a branch line 203 to channel 170 leading to the right hand end of cylinder 55. The port 204 which is the terminal of line 170 in valve 161 is closed at this time, and therefore it will be apparent that pressure fluid will flow from the port 200 to the right hand end of cylinder 55 and cause movement of the piston 56 in the direction of arrow 51 to move the tracer into engagement with a pattern. The other end of the cylinder 55 is connected through a branch line 205 of channel 169 to port 206 which at this time is connected by the annular groove 207 in the valve plunger 162 to the exhaust port 208.

As a result of this, the tracer will move into engagement with a pattern and thus shift its valve plunger 83 to the right as viewed in Figure 18. When the valve plunger reaches a central position both ports 176 and 193 will be connected to the exhaust port 195 due to the fact that the valve spool 196 is of less width than the annular groove forming the port 195 and equal flow on both sides of the spool will take place. No flow will take place through the port 193, however, because the stop valve 185 is assumed to be closed at this time. Furthermore, no flow will take place through the port 176 because both of the motor channels 165 and 166 from the cylinder 55 are disconnected at this time by the valve plunger 162.

Another effect of the tracer valve plunger being moved to its central position is that it closes the pressure port 86 which was supplying fluid to hold the piston 101 in one end of its cylinder. If, at this particular instantaneous position of the tracer valve plunger 83 in its neutral position, the operator should release the control lever 199 the cylinder 55 would be reconnected to its control valve 60 and then the movement of piston 56 would depend upon the position of the control valve plunger 65.

If the eccentric were set at zero feed rate, in which position it would normally be when the machine is not in use, the valve plunger 65 would be in a central position, thereby blocking all flow to or from the lines 165 and 166 and the piston 56 would remain stationary. Therefore, since the valve plunger 65 would block further movement of the piston 56 further deflection of the tracer and concomitant movement of the tracer valve plunger to the right would not take place and the parts would come to rest. The operator may now set the feed rate by rotation of the feed rate control handle 160, thereby creating a certain amount of eccentricity in the eccentrics, and then he would throw the control valve 187 whereby the machine is now capable of automatic operation.

Since the eccentrics would be positioned in accordance with the arrows 45 and 68 as shown in Figure 15, the only movement that could take place would be for the tracer to continue movement toward the pattern, and this would cause movement of the tracer valve plunger 83 to the right of the position shown in Figure 18. This produces two effects in that it throttles the flow through port 176 and also throttles the flow from port 193 to port 195 which would tend to slow down or stop movement of piston 56 because this is the only one that could be moving with the arrows 45 and 68 in the position shown in Figure 15. At the same time the port 86 is connected to port 93 whereby fluid will flow through channel 94, port 97, and line 99 to cause upward movement of piston 101 and clockwise rotation of gear 103.

Attention is invited to the fact that, when pressure fluid is supplied to the channel 94 by overdeflection of the tracer, this line is also connected to a second port 209 which has a channel 210 connected to it and leading to port 211 located in the left end of the valve 161 which communicates with the small cylinder 212 in which the head of plunger 164 slides. The object of this is that if the operator did not release the control lever 199 at the instant that the tracer valve reached its neutral position, but held the valve until the tracer valve moved beyond its neutral position hydraulic pressure would be connected through channel 210 to hydraulically shift the valve plunger 162 to its neutral position automatically.

The connection of pressure to line 99 will cause movement of piston 101 and thereby rotation of the gear 103 and if in a clockwise direction will cause a clockwise direction of rotation of the eccentrics, thereby changing the direction of movement between the tracer and pattern which, if continued, will result in the parts being positioned as shown in Figure 17, or at some intermediate angular position.

The tracer action would continue automatically and the reversing valve 92 would be held in the position shown due to the position of a pilot valve 213 having a pressure port 214 which is directly connected to the pump 58 by channel 215. With the pilot valve plunger 216 in the position shown the port 214 is connected by the annular groove 217 and channel 218 to the left hand port 219 of the reversing valve 92. This holds the reversing valve plunger 220 in its right hand position.

When the machine has completed one stroke across the work a trip lever 221 is rotated by suitable dogs which thereby shifts the pilot valve plunger to the left as viewed in Figure 18 and connects pressure port 214 to port 222. Fluid now flows through channel 223 to the right hand end of reversing valve 92. The valve plunger 220 will shift to the left.

Attention is invited to the fact that, before the reversing valve plunger shifts, pressure existed in line 99 and that this pressure is connected through a branch line 224 to a chamber 225 in which the valve spool 226 reciprocates. The channel 98 is likewise connected by a branch channel 227 to chamber 228 in which the valve spool 229 slides. Thus, when the valve plunger 220 is shifted to the left by the admittance of pressure to channel 223, it will be evident that the valve spool 229 moving to the left will tend to create a vacuum in the chamber 228 and thereby draw fluid from channel 98, lowering the pressure therein; and the movement of spool 226 to the left will contract the chamber 225, forcing the fluid out of that chamber into the channel 99, thereby increasing the pressure therein. Thus, an unbalancing of the pressures in opposite ends of the cylinder 100 will be immediately created, causing the piston 101 to move in the correct direction before the valve has completed its shift. This will cause rotation of the gear 103 and likewise rotation of the eccentrics from the position shown in Figure 17, and otherwise the arrow 68 will rotate clockwise and the arrow 45 will rotate counterclockwise.

It will be noted that the rotation of the arrow 68 will set up a direction of movement as it rotates clockwise in Fig. 17 that will cause retraction of the tracer from the pattern whereby the tracer valve plunger 83 will move to the left, thereby increasing the pressure in line 89, and since this line is now connected by the shifting of the reversing valve to the line 99, the pressure in this line will increase to continue the movement of the piston 101, thereby continuing the rotation of the gear 103. This will continue the rotation of the directional arrow 68 in a clockwise direction from its position in Figure 17 until it reaches a position shown in Figure 16 and continued rotation clockwise from this position will cause the tracer to again move toward the pattern and thereby begin to move the tracer valve plunger back toward a neutral position until the parts are stabilized again for tracing in the new direction.

The tracing action will continue in the new direction until the reversing valve is actuated again, whereupon the reversing action will be repeated except that this time the eccentrics will rotate in the opposite direction.

The assembled unit shown in Figures 1 and 2 is provided with a dovetail guideway 230 by means of which it may be attached to the proper support, such as 231, of a die sinking machine, in such relation that the two directions of control as built into the unit are parallel to the two directions of relative movement between the tool and work support which are to be controlled by the unit.

There has thus been provided an improved automatic pattern controlled mechanism for die sinking machines in which the tracer is automatically provided with a lead over the cutter when the feed rate is selected and which is automatically directionally changed with changes in the direction of feed caused by the pattern.

What is claimed is:

1. A tracer mechanism for a die sinking machine having means for effecting relative movement between a cutter and work support in two directions defining a working plane including a main frame, a tracer housing mounted in the frame and having a connection therewith intermediate the length of the housing, means to attach the frame to the machine with the longitudinal axis of the tracer housing lying in said working plane, a tracer finger mounted co-axially in one end of the housing for engagement with a point on the pattern corresponding to the point on the work engaged by the cutter, and adjustable connections between the other end of the housing and said frame for imparting a crank path motion to one end of the housing and thus a similar motion to the tip of the tracer finger to advance the tracer finger relative to said points of contact and the cutter to impart a lead to the tracer finger with respect to the cutter.

2. A tracer mechanism for a die sinking machine having means for effecting a relative feed movement in different angular directions lying in the working plane of the machine including a main frame, a tracer housing mounted in the frame and having a movable connection with the frame located intermediate the length of the housing, means to attach the frame to the machine with a longitudinal axis of the housing lying in said plane, a tracer finger mounted co-axially in one end of the housing for initial engagement with a point on the pattern corresponding to the point on the work engaged by the cutter and an adjustable eccentric connection between the other end of the housing and said frame for imparting to the tip of the tracer finger a crankpath motion in said working plane to impart a lead to the tracer tip with respect to said initial point of engagement with the pattern and in the direction of feed.

3. A tracer mechanism for a die sinking machine having power operable means for effecting relative movement between a tracer and pattern in two directions defining a working plane, the combination with a rotatable direction control member for said power operable means, of a main frame supporting said direction control member, a tracer housing, operative connections for supporting said housing on said frame for bodily and oscillatory movement, means to attach the frame to the machine with the longitudinal axis of the housing lying in said working plane, a tracer finger mounted co-axially in one end of said housing for engagement with a pattern, one of said operative connections including an eccentric located at the other end of said housing and manually operable means operatively connected to said direction control member and said eccentric for effecting simultaneous adjustment thereof.

4. A tracer mechanism for a die sinking machine having power operable means for effecting relative movement between a tracer and pattern in two directions defining a working plane, the combination with an adjustable rate control member for said power operable means, of a frame supporting said member, a tracer housing, operative connections supporting the housing in said frame for bodily and oscillatory movement in said working plane, means to attach the frame to the machine with the longitudinal axis of the housing lying in said working plane, a tracer finger mounted co-axially in the end of said housing for engagement with a pattern, one of said operative connections including an eccentric and operative connections between said rate control member and said eccentric to effect simultaneously adjustment thereof.

5. A tracer mechanism for a die sinking machine having means for effecting relative movement between a tracer and pattern in two directions defining a working plane including a main frame, a tracer housing, a link connection between an intermediate point in the length of the housing and said frame for supporting the housing for bodily and oscillatory movement in said working plane, means to attach the frame to the machine with the longitudinal axis of said housing lying in said working plane, a tracer finger mounted co-axially in one end of the housing for point contact with a pattern, an eccentric connection between the other end of the housing and said frame, said eccentric having zero adjustment for positioning said tracer housing parallel to the cutter axis of the machine, manually operable means for increasing the eccentricity of said eccentric to impart a lead to the tracer in said working plane, and means to rotate said eccentric to change the direction of said lead in said working plane.

6. A tracer mechanism for a die sinking machine having power operable means for effecting relative movement between a tracer and pattern in two directions defining a working plane comprising in combination an adjustable rate control member for said power operable means, an adjustable direction control member for said power operable means, a main frame supporting said members, a tracer housing mounted in the frame, means to attach the frame to the machine with a longitudinal axis of said housing lying in said working plane, a tracer finger mounted co-axially in one end of the housing for engagement with the pattern a linkage mechanism supporting the housing at an intermediate point in the length thereof to said frame, an eccentric mechanism connecting the other end of said housing to said frame, operative connections between said rate control member and said eccentric mechanism whereby adjustment of the former will simultaneously effect eccentric adjustment of the latter for varying the eccentricity thereof to impart a lead to the tracer in accordance with the rate of operation of said power operable means, and additional operative connections between said direction control member and said eccentric mechanism for varying the angular direction of said lead in accordance with changes in the direction of resultant movement between the tracer and pattern in said plane.

7. In a tracer mechanism for governing the feed operation of a die sinking machine having a working plane of operation, the combination with a rate control lever, of a frame supporting said lever, a housing containing a tracer and tracer control valve supported on said frame, said frame being attachable to the machine with the axis of said housing lying in said working plane, means for adjusting said housing in said plane relative to the frame to cause the tracer to engage a point on the pattern corresponding to a point on the work to be engaged by the cutter of the machine, said adjusting means including an eccentric, and operative connections connecting the eccentric to said rate control lever for varying the degree of eccentricity of said eccentric simultaneously with changes of rate, said lever having a neutral position for nullifying said eccentricity and setting said rate at zero.

8. A tracer control mechanism for a die sinking machine having power operable means for effecting relative movement between a tracer and pattern in two directions defining a working plane, said mechanism including means for controlling the direction of said relative movement effected by said power operable means, a tracer finger supported by said mechanism, adjustable means for imparting a lead to the end of said tracer finger in said working plane relative to a normal point of engagement with the pattern corresponding to the point on the work engaged by the cutter of the machine and in the direction of said relative movement, means automatically controlled by the tracer for synchronizing changes in the direction of the relative movement and the direction of said lead of the tracer, and manually operable control means for varying the rate of said relative movement between the tracer and pattern and simultaneously modifying the lead of said tracer.

9. A tracer control mechanism for a die sinking machine having power operable means for effecting relative movement between a tracer and pattern in two directions, defining a working plane, one of said directions being normal to the general surface of the pattern, comprising a main frame attachable to the machine, a tracer housing mounted in the frame with its longitudinal axis lying in said plane, a tracer finger mounted in one end of the housing for engagement with a point on the pattern corresponding to a point on the work engaged by the cutter of the machine, oscillatory connections adjustably supporting the tracer housing in said frame, means to adjust the housing to advance the tracer finger in the direction of said relative movement and relative to said points and cutter to impart a lead to the tracer, and power operable control means governed by the tracer and operatively connected for varying the rate and direction effected by said power operable means and simultaneously effecting adjustment of said tracer housing in accordance with variations in the direction of said relative movement to vary the direction of the lead of the tracer.

10. In a tracer control mechanism for a pattern controlled die sinking machine having power operable means for effecting two directional relative movement between a tracer and pattern, said two directional movement defining a working plane for the machine, the combination of a tracer finger adapted to be mounted in said working plane, means supporting said finger for deflection upon engagement with the pattern, means responsive to deflection of the tracer finger to cause said power operable means to generate a cutting path in said plane, rate control means for said power operable means to control the rate of generation of said cutting path, means operable by said control means to shift the tracer finger relative to its normal point of contact with the pattern corresponding to the point on the work engaged by the cutter to impart a lead to the tracer finger in accordance with said rate, and additional means responsive to deflection of the tracer to impart a crank path motion to the end of the tracer about said normal point of contact to maintain the direction of the tracer lead in correspondence with the direction of feed.

11. In a tracer control mechanism for a die sinking machine having means for effecting relative movement between a tracer and pattern in two directions defining a working plane, the combination of a frame, a tracer housing mounted in the frame, means to attach the frame to the machine with a longitudinal axis of said housing lying in said working plane, means oscillatably supporting said housing on said frame, said housing having a control valve plunger, and a deflectable tracer finger for controlling the position of said plunger, a rotatable eccentric connection between the housing and frame, the eccentricity of which is adjustable to zero, means to effect a predetermined eccentric adjustment of said connection to impart a feed directional lead to the tracer finger relative to its normal point of contact on the pattern corresponding to the point on the work engaged by the cutter, means to rotate said eccentric connection to angularly change the direction of said tracer lead with respect to its normal contact point, rate and direction control valves mounted in the frame and operatively connected for determining power movement of the tracer finger with respect to the pattern, a second rotatable eccentric connection between said frame and said valves for controlling the position thereof, means to adjust the eccentricity of said last-named connection to determine the feed rate position of said valves, means to rotate said last-named connection to determine the direction of feed, power operable means controlled by said tracer valve for governing jointly the rotatable adjustment of both of said eccentric connections to synchronize the directional components thereof, and a common control for jointly effecting the eccentricity adjustments of said connections.

ERWIN G. ROEHM.

REFERENCES CITED

The following references are of record in the file of this patent:

UNITED STATES PATENTS

| Number | Name | Date |
|---|---|---|
| 1,959,178 | Sassen | May 15, 1934 |
| 2,239,625 | Roehm | Apr. 22, 1941 |
| 2,332,532 | Roehm | Oct. 26, 1943 |
| 2,332,533 | Roehm | Oct. 26, 1943 |
| 2,424,031 | Heer | July 15, 1947 |